United States Patent [19]

Nici et al.

[11] Patent Number: 4,512,017

[45] Date of Patent: Apr. 16, 1985

[54] DIGITAL DUAL CHANNEL COMMUNICATION TERMINAL

[75] Inventors: Richard J. Nici, Ocean; George W. Schramm, Oakhurst, both of N.J.; John B. Sharp, Boulder, Colo.

[73] Assignee: AT&T Information Systems, Holmdel, N.J.

[21] Appl. No.: 464,058

[22] Filed: Feb. 4, 1983

[51] Int. Cl.³ .............................................. H04J 3/12
[52] U.S. Cl. ................................................ 370/110.1
[58] Field of Search .................. 370/110.1, 60, 66, 92

[56] References Cited

U.S. PATENT DOCUMENTS

| | | | |
|---|---|---|---|
| 3,411,143 | 11/1968 | Beausoleil et al. | 370/92 |
| 3,997,874 | 12/1976 | Kelly et al. | 370/66 |
| 4,061,879 | 12/1977 | Wintzer | 370/92 |
| 4,258,434 | 3/1981 | Glowinski et al. | 370/60 |
| 4,328,559 | 5/1982 | Markhasin et al. | 370/92 |
| 4,403,322 | 10/1983 | Kato et al. | 370/110.1 |
| 4,420,831 | 12/1983 | Hackett | 370/92 |

OTHER PUBLICATIONS

"Diavox Courier 700, Digital Switching Telephone for MD 110"; Ericsson Review, No. 2, 1982, pp. 22–30; Reinius et al.

"System Evolution-Integrated Services Network"; International Switching Symposium, Montreal; Sep. 21–25, 1981, Session 41B, Paper 1, pp. 1–7; Oliver et al.

Primary Examiner—Douglas W. Olms
Assistant Examiner—Frank M. Scutch, III
Attorney, Agent, or Firm—David H. Tannenbaum

[57] ABSTRACT

There is disclosed a digital telephone having dual voice and data handling capability over a single communication line. Time separated information channels are used to transport the voice and data information between the terminal and the main processor. A separate signaling channel is shared between the two information channels and information on the signaling channel is accumulated for distribution to either the voice device or the data device in accordance with address information contained within the accumulated signaling channel message.

10 Claims, 16 Drawing Figures

| • LCN • | 0 • 0 | GR | 1 |

FIG. 9

SABM
| ADDRESS |
| 1 1 1 1 P 1 0 0 |
| MCS |

I
| ADDRESS |
| 0 | N(S) | P | N(R) |
| 0-14 INFORMATION BYTES |
| MCS |

RR
| ADDRESS |
| 1 0 0 0 F | N(R) |
| MCS |

FOR MAIN PROCESSOR: F=1
FOR SET: F=P OF
I MESSAGE

FIG. 12

DM
| ADDRESS |
| 1 1 1 1 F 0 0 0 |
| MCS |

UA
| ADDRESS |
| 1 1 0 0 F 1 1 0 |
| MCS |

FOR TERMINAL:
F=P OF SABM MESSAGE

(1) HANDLER 203 INDICATES A BLOCK OF INFORMATION TO SEND
(2) DATA ON BUS (FDAT 0-3) IS VALID
(3) VOICE OR DATA MODULE INDICATES ACCEPTANCE OF THE NIBBLE
(4) VOICE OR DATA MODULE RESPONDS TO STB BEING LOWERED BY LOWERING ACK
(5) END OF A TRANSFER BY LOWERING WRITE BEFORE LOWERING STB1 OR STB2

FIG. 16

| TYPE | ADDRESS |
|------|---------|
| DATA (0) ||
| DATA (1) ||
| ⋮ ||
| DATA (N) ||

DIGITAL DUAL CHANNEL COMMUNICATION TERMINAL

BACKGROUND OF THE INVENTION

This invention relates to a digital communication station and more particularly to such a station which can handle multiple communication connections using a single communication line.

The last few years have seen a proliferation of data devices, such as word processors, computer terminals, and computers, all connected to the telephone line. It is safe to predict that in the next few years this trend will increase to the point where it will be highly desirous to have conveniently placed outlets for plugging such data devices into the telephone network. As it stands today, it is necessary to have a separate communication line run to each location where a terminal is desired much as one would do for a telephone connection.

In copending patent application of Baugh-Smith, Ser. No. 341,840, which is hereby incorporated by reference herein there is detailed an arrangement for using two time separated channels for transmitting information on a single line. The Baugh et al application discloses a multiplexed channel which can be used to provide statistically multiplexed bursty data from a number of different sources. Using the Baugh teaching, a communication set using each information field (I field) to control information to a separate destination, i.e., voice to a voice transducer and data to a data transducer has been designed to alleviate the problem of running extra communication wires to every terminal.

Using the Baugh et al approach and then realizing that signaling to the telephone station can be achieved over the multiplexed channel gives an elegant selection to a difficult problem but also leaves us with the constraint that data signaling must not be delayed waiting for the completion of voice signaling. Thus, some method must be devised to allow a data user at a telephone station to establish a connection, possibly electronically, while that station is being used to establish a separate voice connection. This constraint suggests separate S channels for each information field. Such a solution, however, reduces bandwidth and consequently affects the number of stations serviceable from a processor.

Accordingly, it is desired to establish a multi-connection telephone station using time separated information fields and multiplexed signaling capability without causing one of the information channels to be penalized because of signaling on the other channel while at the same time reducing to a minimum the amount of information contained in the S field.

SUMMARY OF THE INVENTION

We have solved the problem of minimum S channel data by using a single S channel for both the voice and the data channel, and by using only one bit in the S channel. The information on the information channels are stripped off and provided on a communication path to the transducer associated with each field. Thus, the telephone set operates to direct the information from field I1, for example, to a voice module, while the information from field I2 goes to a data module.

The S channel is handled in a different manner. A common data bus is established from an input/output control circuit such that any information on the S field can be presented to or received from either the voice or the data modules. The telephone set is also arranged to accumulate individual data bits over a number of frames from the S channel and to form that accumulated data into a message having address headers, information fields, and check sums. These messages are then distributed either to the voice module or to the data module under joint control of the address header. Sub addresses are used to direct information to still other modules, such as for example, a display module. In this manner a single S channel can be used for both of the information fields. Since the signaling bus is available between messages for any communication, and since each message is only a small portion of a continuing transaction, neither channel is blocked by the other channel for any significant length of time.

BRIEF DESCRIPTION OF THE DRAWING

The invention and its several other objects, features and advantages will be more readily understood from a reading of the description to follow taken in conjunction with the drawing, in which.

DETAILED DESCRIPTION

Figure 1:
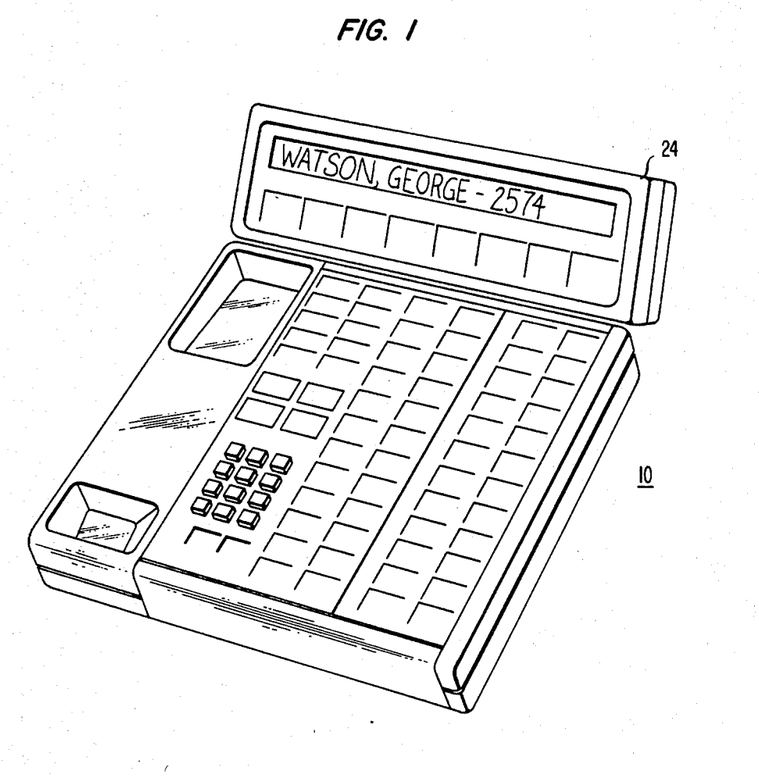
FIG. 1 is a pictorial view of the station set with a display module attached.

FIG. 1 shows a digital telephone station terminal 10 having a display module 24 attached thereto.

Figure 2:
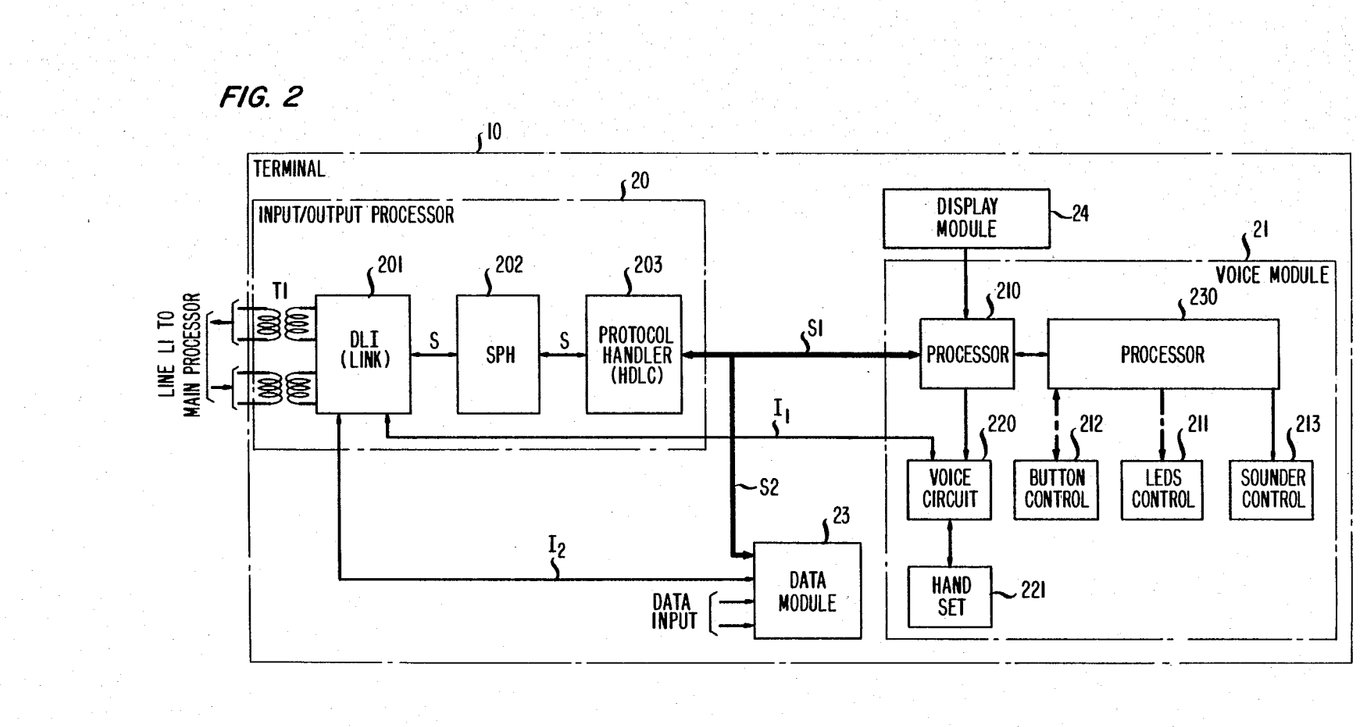
FIG. 2 is a block diagram of our system showing the main components of the station set.

As shown in FIG. 2, communication terminal 10 is connected to telephone line L1 and to main telephone processor (not shown) by transformer T1 and input-/output processor 20.

The digital line interface circuit DL1 201 is a hybrid integrated circuit device that transmits and receives the line signals. The receiver adjusts for line losses, recovers the bit clock, and converts the data into a stream of logic bits. The transmitter combines the data from the information and signaling channels and sends over line L1 a set of electrical signals equivalent to that data.

Circuit SPH 202 converts the signal channel (S) from serial form to parallel form for protocol handler 203. In addition, this circuit adds additional bits to the transmit data so that flag characters can be distinguished from all other data. The receive section removes these extra bits so that data to protocol handler 203 is not modified.

Protocol handler 203 is a microcomputer that has been mask programmed to interpret and support the HDLC protocol on the S channel. Handler 203 accepts information from SPH 202 and determines if a valid message is present. It then "handshakes" that data to the appropriate interface, either voice module 21 or data module 23.

Either processor 210 or 230 in the voice module, or an attached module, such as a display module, may detect button pushes, flash the indicators, interpret and generate messages, et cetera, and route the messages through processor 210 to be transmitted and received via the S channel over line L1.

Figure 5:
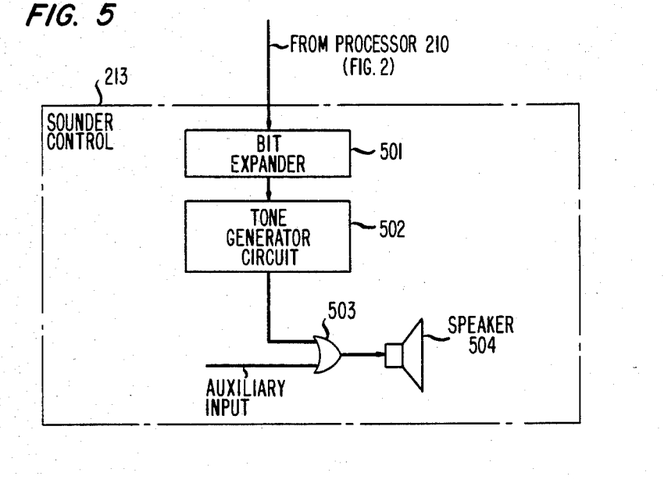
FIG. 5 show details of the station set.

The control inputs to tone generator circuit 502 (FIG. 5) are the normal ringing mode select (NMLG) and tone-ringer on control (RINGON). The tone generation circuit is a counter circuit that uses the crystal provided master clock to provide a 711 Hz signal modulated by a 20 Hz square-wave or an unmodulated 711 Hz signal. NMLRG selects between the normal signal, which is 711Hz modulated by a 20Hz square-wave. RINGON acts, as its name implies, to turn the ringer on. One of the optional modules that can be attached to the basic voice module 21 is the display module 24. Display module 24 has a 40 character alphanumeric display to show the user English-like messages. In addition to showing the number being dialed, it is used to show the origin of a call before it is answered. Information about call forwarding, call coverage data, and time are displayed in response to S channel messages from the line. This module can be disconnected and removed from the telephone.

Voice circuit 220 (FIG. 2) amplifies and shapes both the transmit and receive audio signals and permits selection between the handset, the speakerphone, or the headset for voice input. TOUCH-TONE signals for dialing are also provided here. This circuit is principally a single-chip mu-255 law CODEC with a hybrid amplifier, a solid state analog switch and a TOUCH-TONE generator circuit.

Communication signals, including voice, data and signaling information, is received (or transmitted) over line L1 by DLI circuit 201 of input/output processor 20. The signals are contained in separate time separated fields or channels using a protocol having a multi-bit I1 field, a multi-bit I2 field and a single bit S field for each repetitive frame. The I1 field data goes to voice module 21 over communication path I1, the I2 field data goes to data module 23 over communication path I2 and the signaling information in field S is sent via SPH 202 to protocol handler 203 for distribution, as necessary, to either the voice module or the data module. As will be seen, the S field is used to carry lamp and ringing messages, dialing signal messages and switch-hook messages. The field also carries information for delivery to display module 24 via the voice module.

The voice module processor 210 functions as a message switch for the display module and processor 230. The processor 210 receives all S1 channel messages. It routes messages that are to be executed by the attached module to that module. Messages that deal with the ringer and indicators are routed to processor 230. Other messages are executed directly by processor 210. Messages to be transmitted by the attached module or processor 230 are interspersed with other voice module messages and passed on to the protocol handler. The processor 210 handles any contention for the S1 channel by the optional module or processor 230.

Data module 23 functions to buffer signals between input/output processor 20 and a data input to which, for example, a computer terminal could be connected.

The data module 23 functions to interface a customer terminal (RS-232C interface) to the line. The signaling information is transmitted over the S2-channel. Customer data, and the state of the RS-232C interface leads is contained within the I2 field.

MESSAGE DELIVERY

Now we will look in more detail at the process by which the central processor (not shown) communicates with the telephone station, for example, to flash a lamp. A three-level protocol is used where level 1 is the physical level; level 2 is the well-known HDLC (subset) level and includes addresses, check sums, and retransmission protocols; and where level 3 contains the active telephone instructions.

Communication between the digital telephone and the main processor is over a 4-wire full duplex serial data link L1. Data is transmitted over link L1 in alternate bipolar format at a rate of 160,000 baud.

Figure 6:
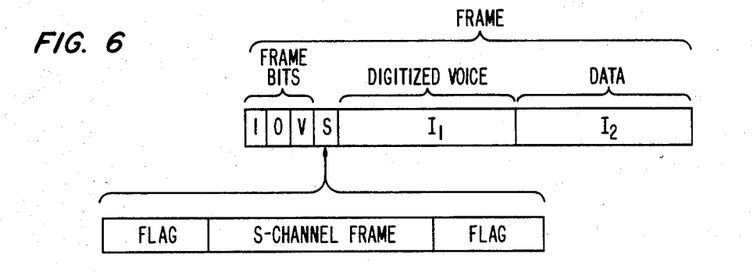
FIGS. 6 and 7 show the layout of the I and S channels and the packet format of the resulting reconstructed S channel message.

The frame format of data into and out of the telephone is depicted in FIG. 6. The first 3 bits of each frame are known as framing bits. The framing bits in order of appearance are logical '1', '0', and 'V' where V denotes an alternate bipolar violation. The first bit following the framing bits is referred to as the S-channel bit. The next data field is called information field 1 (I1). This data field, in our embodiment, contains digital voice information. The second data field is known as information field 2 (I2) and, in our embodiment contains data for delivery to and from data module 23 (FIG.2). The I and S fields can be controlled in accordance with the teachings of Baugh-Smith in U.S. Pat. No. 4,251,880 dated Feb. 17, 1981 and in patent application Ser. No. 341,840, filed Jan. 22, 1982, both hereby incorporated by reference herein.

Figure 7:
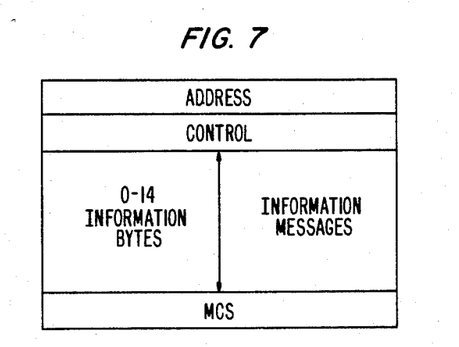

The reconstructed format of the S-channel frame is shown in FIG. 7. Each S-channel frame is separated by at least one S-channel flag. These flags are removed by SPH 202 (FIG. 2) for frames sent out to the line. As can be seen from FIG. 7, each S-channel frame is serially reconstructed from the single bit S-channel into a number of multibit bytes which consist of an address byte, control byte, 0–14 information bytes, and a message check sequence (MCS) byte. The address byte identifies the S-channel frame as being for channel 1 (S1) or channel 2 (S2) corresponding to I1 and I2. The control byte identifies the S-channel frame as one of the acceptable HDLC protocol frame types.

The information bytes (if they are present) contain S-channel information messages either going to or coming from the local interfaces such as voice module 21 or data module 23. These messages will contain such information as ringer on, off hook, on hook, light LED et cetera. The last byte of every S-channel frame is a check-sum on the address, control and information fields. The link protocol uses the check-sum to detect errors and to request retransmissions to correct errors.

Figure 8:
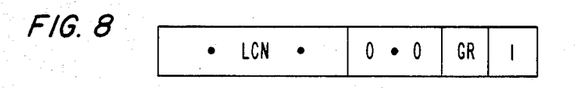
FIGS. 8–13 show the various control formats for the S channel message.
Figure 9:
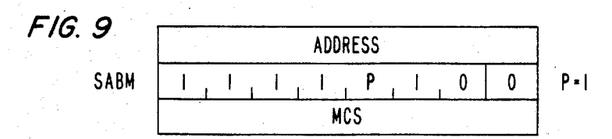
Figure 10:
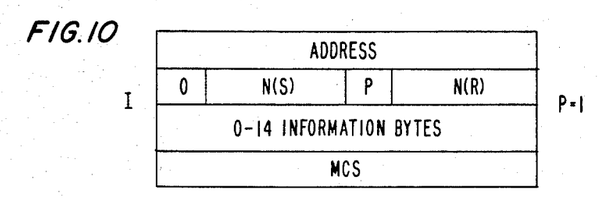
Figure 11:
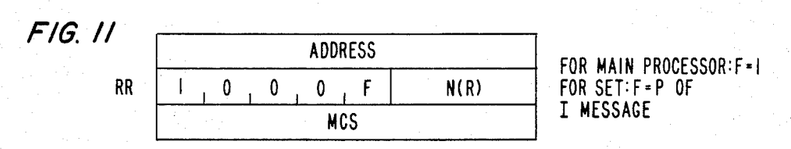
Figure 12:
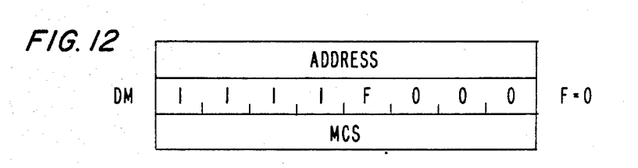
Figure 13:
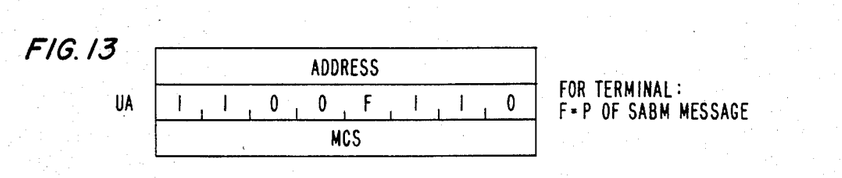

The address field of each S channel messages associates a module with the message. The format of the address field as we will use it is shown in FIG. 8 where the command response bit (CR) is "1" for a command and "0" for a response. The logical channel number field (LCN) is 14 for S-channel S1 and 15 for S-channel (S2).

Some HDLC message types to be implemented and their formats are given in FIGS. 9–13. Messages can be divided into those that the line sends to the terminal and those that are sent from the terminal to the line. This information is given in the second or control byte. The bits designated by F and P indicate the origin of the message. The bits designated by N(S) gives the sequential number of the messages sent while N(R) is the number of received messages.

MAIN PROCESSOR (LINE) TO TERMINAL

Set Asynchronous Balanced Mode (SABM) Command:

The SABM command (FIG. 9) is generated by the line to initialize or reset the signaling link protocol.

Information Command: As priorly discussed, the information command (FIG. 10) is used to transfer sequentially numbered user messages between the line and the terminal.

Receive Ready (RR) Response: The receive ready (FIG. 11) is used to acknowledge the previously received I message and to indicate that it is ready to receive another I message.

TERMINAL TO MAIN PROCESSOR (LINE)

Disconnected Mode (DM) Response: The disconnected mode (FIG. 12) is used as a message from the terminal to request link initialization.

Unnumbered Acknowledge (UA) Response: The unnumbered acknowledge (FIG. 13) response is used to acknowledge the receipt of a SABM from the line.

Information Command: The information command (FIG. 10) is the same as from the scanner to the terminal, for passing user messages such as button depressions, switch-hook state changes, and lamp inquiry responses.

Receive Ready (RR) Response: The receive ready (FIG. 11) is used in the same manner as from the scanner to the terminal, to acknowledge received information messages.

Figure 14:
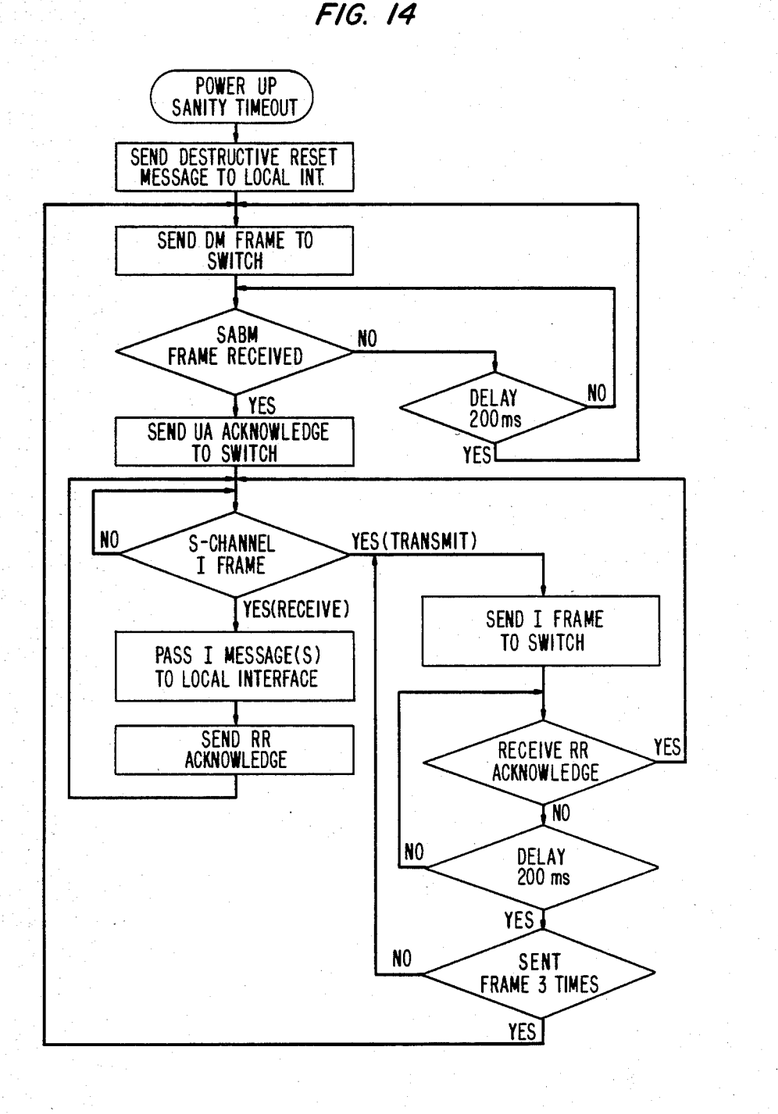
FIG. 14 is a flow chart of the manner in which the messages are formatted.

The manner in which these commands are used to control the protocol conversion and data transfer are set out in FIG. 14.

When power is applied to the terminal, the destructive reset message is sent to the voice module 21 and data module 23. The protocol handler 203 then sends a DM message to the line and waits to receive the SABM message to establish the communication link. After 200 millisec. it sends another DM message. This continues until an SABM is received. When the protocol handler gets the SABM, it responds by sending the UA message. It is now in a state to receive and transmit information messages over the S-channel. If an I message is received, and the check-sum is correct, the content is passed the assigned voice module or data module and the RR message is sent to the line to acknowledge receipt of the information. If one of the modules has information to be sent to the line, the protocol header and check-sum bytes are added and the S-channel message is sent to the line. The protocol handler then waits for an RR message from the line. If one is not received in 200 millisec. the S-channel message is sent again. After another 200 millisec this is repeated. After three transmissions of the same message, the protocol handler decides the link is down and begins to send DM messages again to reestablish the link. Throughout this process messages can be sent and received independently. Furthermore, the separate logical channels, S1 and S2, may operate independently. That is while the link is down for S2, it may still be up for S1, even though they share the same hardware link.

Figure 15:
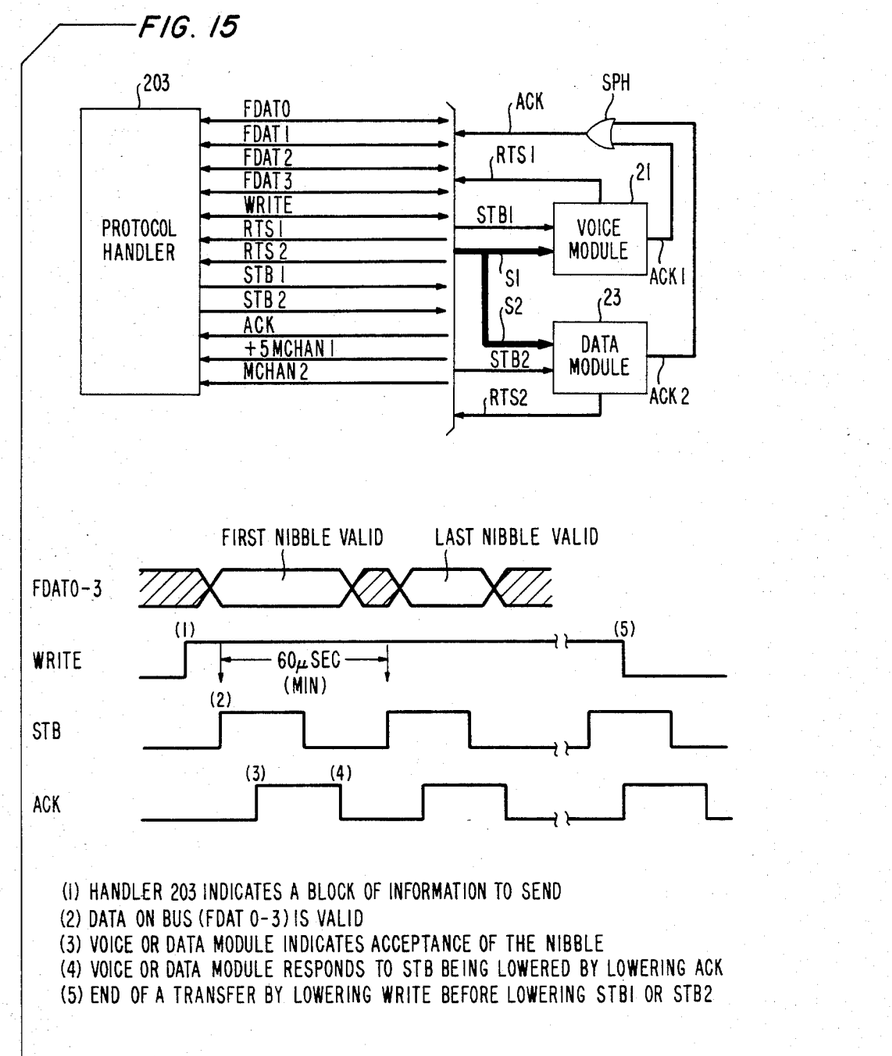
FIG. 15 shows details of the message decoding arrangement of the S channels, including a timing sequence.

The information bytes of an S message are exchanged between input/output processor 20 (FIG. 2) and either the voice or data modules as a sequence of nibbles over the 4-bit data bus FDAT[0-3] as shown in FIG. 15. The adopted convention is to transmit the low nibble first. Both logical channels, S1 and S2, use the same 4-bit data bus and information on this bus is distinguished by the strobing of STB1 and STB2. The two logical channels share the same acknowledge (ACK) input to handler 203. Once a data transfer from handler 203 on either S-channel has begun, the handler remains dedicated to the transfer until completion. Only after the termination of the data transfer can the other channel be activated.

As shown in the lower half or FIG. 15, the STB (Strobe) shown may be either STB1 or STB2. The ACK signal is the logical or output of ACK1 and ACK2. The WRITE output signal from the handler is the same for either channel. The quiescent state of the signals is logical "0". The five steps illustrated in FIG. 15 show the sequence for a single message data transfer.

The information bytes are sent by the voice and data modules to the handler in the same manner that the handler sends them to the modules. Each module requests to send a block of information bytes to the handler by raising its RTS singal. The handler responds by raising lead STB. At this point the module responds by checking WRITE and RTS. The module places the lower nibble of the first byte of data onto bus FDAT[0-3] and then raises ACK. The handler inputs the nibble and lowers STB. The module then responds by lowering ACK. This procedure is repeated until the module reaches the last nibble to be transferred. At this point the module indicates to the handler that the last nibble has been exchanged by lowering RTS prior to lowering ACK. The handler, seeing that RTS has been lowered before the falling edge of ACK, recognizes this as the final nibble of the exchange.

Input/output processor 20 will send back to the main processor over line L1 S2 messages in response to S2 messages from the data module and will send back S1 messages in response to S1 messages from the voice module. Thus, it appears to the main processor that there are two independent devices attached to the communication set. Each of these devices is given a calling number and as discussed a single line is used for completing calls to each number, with one number associated with the voice module and the other associated with the data module.

Figure 16:
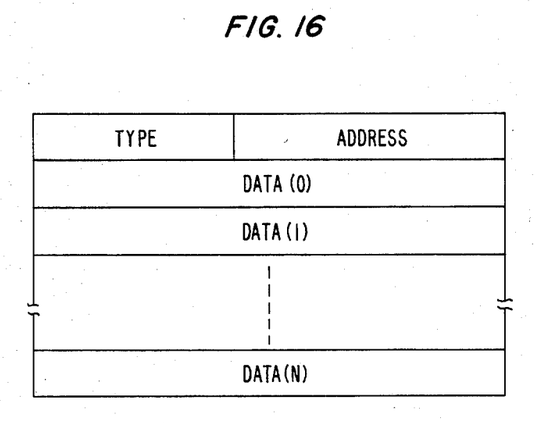
FIG. 16 shows a message format for the instruction message.

The message set includes four basic message types. These types are explicitly identified by the message field coding. The first type is called the command. The command message type indicates that the message is either a command from the main processor, or a stimulus from a terminal. The second message type, the inquiry, is usually sent to determine status. The response to an inquiry is the third type. The fourth type, called the transparent message, functions as an escape mechanism. It is currently used for transmission of ASCII text. In its simplest form, a message is coded with the message type, address, and data pertaining to the address, as shown in FIG. 16. The explicit identification of the message type allows for uniformity within the messages. Every stimulus address has reserved for it a command, inquiry, and response state. Address information in a transparent message type identifies where to deliver the message, while the content of the message is not constrained and may even contain another message.

The message type field is a two bit field located in the first byte. The coding is as follows:

COMMAND =00
INQUIRY =01

RESPONSE = 10
TRANSPARENT = 11

The group identifier field is a five bit field. It is also located in byte 1. The purpose of the field is to structure addresses in order to allow orderly expansion of the message set. The following code set is typical:

00000 = Terminal
00011 = Display
00001 = Function Key Module
00010 = Call Coverage Module
00100 = Data Module
11111 = Internal In FIG. 2, processor 210 utilizes a serial bus to transfer information to processor 230 and to any attached module. The visual indicators are updated every 50 msec. with the current state of the lamps. Button control 212 is controlled by a button sensing routine associated with the button matrix. This matrix includes a twelve key multifrequency pad, and all membrane keys. An additional lead (not shown) is sampled by the voice module processor to determine if a data module is attached. A TOUCH-TONE generator is driven by processor 210 and produces the appropriate dual frequency analog signal as an output. If no keypad buttons are depressed the generator is turned off.

Figure 3:
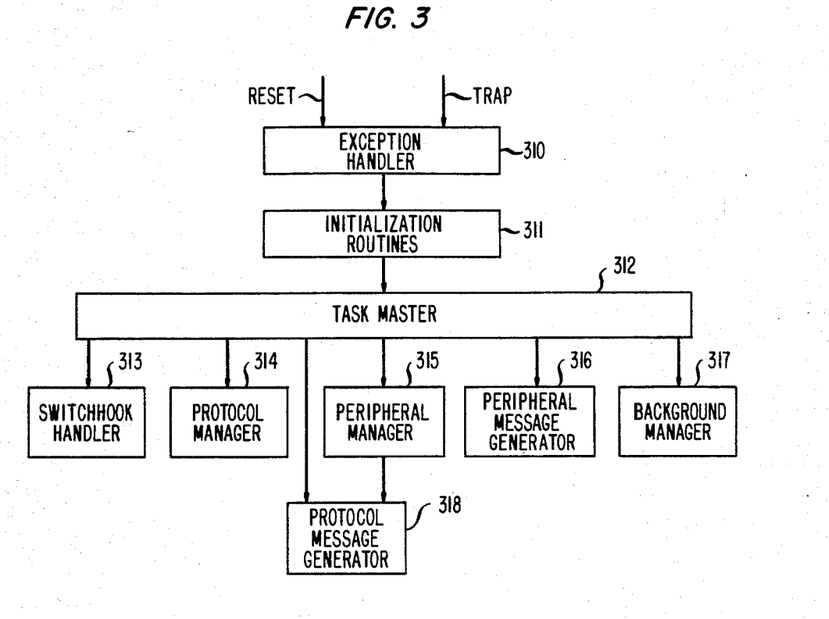
FIGS. 3 and 4 are flow charts detailing the manner in which the messages are divided and applied to and from the station.

The basic flow of processor 210 software is shown in FIG. 3. Exception handler 310 is a short routine that is called whenever there is a trap (program flow error), hardware or software reset, or interrupt. It determines the correct course of action when one of these exceptions occurs.

The next routine is the initialization routine 311 which sets the entire user RAM to zero. All flags in the program use zero as its initialization state, so no explicit initialization of flags are necessary. Then all pointers are set to the top of their respective buffers.

Task master 312 is the base routine that controls the operation of the non-interrupt software. Below is a list of all the routines that it calls, and the condition required to call it. All the routines have one entry point and several exits. The code starts at the top of the routine, and can exit at any point. Each routine sets parameters and variables such that the next entrance into the routine will know where it left off. The one exception to this rule is peripheral manager 315 which has a section named protocol message generator 318 that can be called separately.

Switchhook handler 313 samples the following inputs: switchhook status; speakerphone status; and data module 23. It debounces all the inputs and sets bits in {db_state} indicating the state of the inputs (after debouncing), and {db_change} indicating if the input has changed. The routine nominally scans the inputs every two milliseconds, and provides a debounce time of fifty milliseconds. The routine uses the table {hook_stat} to determine what action, if any, is necessary. This table indicates the correct state of the audio paths and if switchhook messages are required to be generated. Switchhook handler 313 will directly switch the audio paths, and request switchhook messages to be sent by controlling {p_mess_que}.

Switchhook handler 313 is called whenever the debounce timer {db_timer} expires. This timer is set by several routines including switchhook handler 313 so this routine can even call itself when needed. When the message interpretation routines decipher a disconnect or off-hook alerting message, it will take action immediately and change {db_timer} to allow Speakerphone to react before sampling the various switchhooks again. The timer is decremented by the two millisecond interrupt routine.

Protocol manager 314 routine handles incoming messages from protocol handler 203 and is executed in two sections. The first section, called the input filter checks for valid input messages and handles the routing of messages that are to be executed by other computers. It will directly transmit messages to port 1 or port 2 for execution. Port 1 will typically be connected to processor 230 and port 2 will typically be connected to a display module. If either of these ports are busy, it will exit so that other routines can be processed while the port is busy. This routine, among others, can make the output ports busy. Messages are split into commands and inquiries. Inquiries cause an internal request for reply to be set by controlling {f_mess_que}. Commands are executed directly. Any invalid message detected in protocol manager 314 causes an internal request for an appropriate error message to be sent to port 2 for diagnostic monitoring.

This routine is called whenever the {f_rec_buf} pointers indicate that the buffer is not empty. If this routine is exited without handling all the messages, it will be called again by the task master 312 until the buffer is empty.

Peripheral manager 315 starts with interpreting peripheral messages. The messages received from port 1 or port 2 are interpreted by this routine. The first test is for internal messages such as test button state changes and state of health, which are executed directly. Dialing messages may be sent to the line or executed directly depending on the last dialing administration message. If executed in processor 210, then a table is used to translate the correct code needed for the activation of tones. Processor 230 and the TOUCH-TONE generator provide all the timing necessary for the generation of legal signals. All other messages are sent to protocol message generator 318 for loading into a transmit buffer {f_xmt_buf} for ultimate transmission to the line. All messages earmarked for the line are sent to protocol message generator 318 which is executed immediately after this routine.

Peripheral manager 315 is called whenever the UART BUFFER {u_rec_buf} is not empty, indicating a message has been received from port 1 or 2. This buffer is loaded by an interrupt routine that handles the UART receive FIFO.

Protocol message generator 318 along with peripheral manager 315 controls the transmission of information to handler 203. It handles the generation of all internal messages to be transmitted to handler 203. It will pack messages as much as possible to achieve maximum throughput. Peripheral messages are given priority since processor 210 has much more buffering capability than the other microcomputers. This routine loads handler tramsmit buffer {f_xmt_buf} with the information to be transmitted. It is called if the message queue {f_mes_que} is not empty. This variable contains the flags for the internal messages.

Peripheral message generator 316 sends messages internal to the terminal to ports 1 and 2. The flags in variable {p_mess_que} indicate which type of internal message is to be sent. The are: switchhook state change messages; error code messages; reset messages; and identification request messages. As with the other routines, it will send messages only if the port is not busy. All internal messages are stored as flags in {p_mess_que} and text messages are stored in either {f_rec_buf} or {u_rec_buf{. A call is made to this routine only if {p_mess_que} is not empty indicating a pending internal message.

Background manager 317 handles functions that do not have to be executed often and are not sensitive to real time. It also was used to shrink the timer interrupt program as much as possible. The timer interrupt is called every two milliseconds, so any overhead in this routine would severely limit the real time response of the microcomputer.

Background manager 317 is called by task master 312 whenever the background timer flag is set. The flag is set by internal timer 415 (FIG. 4) every fourth timer interrupt (eight milliseconds).

Background manager 317 turns off the tones if S channel messages are enabled, or if the tones flag indicates that the tones should be off. This routine serves two purposes: if the telephone was switched to the S channel mode during the generation of tones, this routine would turn them off, also, if the latch driving the TOUCH-TONE generator changed state (e.g. due to static discharge) then this routine would turn the tones off. Background manager 317 also forces the output ports to agree with internal images to avoid the situation where the software thinks that the outputs are in one state, and they are in fact in another state.

Background manager 317 handles the internal ID request timing to the serial ports. {ID_SEND} sets the amount of time between background ID requests. When the {ID_timer} equals {ID_SEND}, then the flag is set to indicate to protocol message generator 310 routine to generate an ID message to ports 1 and 2. {ID_REPLY} sets the time allowed for each port to reply to the message. In the current version of code, the background requests go out every minute, and 90 ms are allowed for a reply. A no response from port 2 indicates that neither the display module, nor any other module is attached to the set. On the other hand, a no response from port 1 indicates bad health, since processor 230 should always respond.

Background manager 317 checks the entire ROM by a running exclusive or on all memory locations. The byte {ck_sum:} is adjusted such that the result should be zero. Any other result will cause bad health, and an error message to be sent. This routine only checks one byte at a time and takes about 15 seconds to complete. Manager 317 also executes a RAM test and checks the entire RAM by writing alternating one-zero patterns into each byte and checking that the correct data can be read out.

The structure of the interrupt handler 410 (FIG. 4) is similar to the task master 312 (FIG. 3) where routines have one entry point and several exits. As with the other routines, any interrupt can be exited at any time, and variables will be set up indicating the point of exit. A routine read interrupt (not shown) reads the interrupt controller and adds any interrupts to the variable {i_irq}. Interrupt handler 410 reads this image {i_irq} to determine which interrupt is pending.

Figure 4:
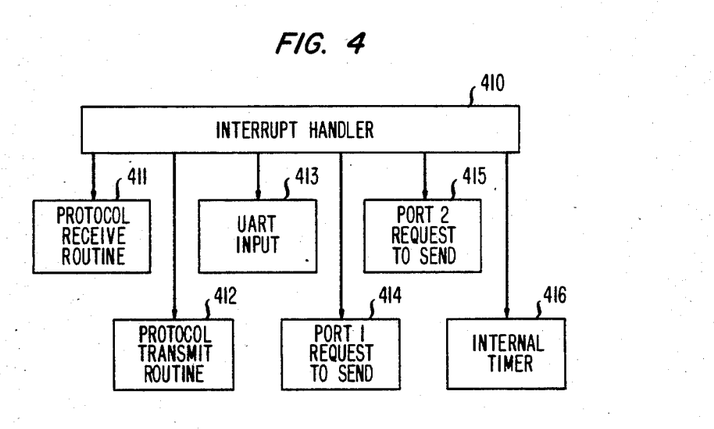

The protocol transmit routine 411 is called by an interrupt. Should the interrupt controller miss the interrupt, or if the handler 203 does not properly handshake messages, then this routine can also be called by a static active level of the STB1 signal. Therefore, the following conditions must be present to execute this routine:

A rising edge of the STB1 (FIG. 15) signal, or a static high level of the same signal.

The write (FIG. 15) signal in the inactive (read) state.

The pointer {f_xmt_bot} indicates that there is a message in the transmit buffer.

If all these conditions are true, then this routine handshakes the message to the handler 203. This routine acts as a high speed dedicated transfer to the handler 203. As such, if there is any lock up in the communications, a sanity timer will cause an exit of the routine.

The protocol receive routine 411 will handshake messages from the handler 203 into a buffer. The following conditions must be met to execute this routine:

A rising edge of the STB1 (FIG. 15) signal, or a static high level of the same signal.

The write (FIG. 15) signal in the active state.

The pointer {f$_{13}$ rec_bot} indicates that the protocol handler 203 receive buffer is empty.

The UART input 413 is called whenever a character enters its UART receiver. Messages received by the UART can either come from port 1 or 2. This is controlled by a UART multiplexer under software control. If the UART receive buffer {u_rec_buf} is not empty, this routine will exit and generate an error message. Otherwise, the UART (which contains a FIFO) will be emptied into the {u_rec_buf}. If there are too many characters in the FIFO, processor 210 will empty the balance of the FIFO and generate an error message. The FIFO can hold fourteen characters, while processor 210 is only allowed to receive six characters.

Port 1 request to send 414 is called when the processor 230 requests service from the processor 210. If the UART is not already busy, this routine makes the UART busy, switches the UART to port 1 and starts the reply timer. If the UART is already busy, then this routine will exit, and will be executed when the UART is free.

Port 2 request to send 415 services requests from port 2 (the display module, or any other module). It does the same function as port 1 request to send 414 for port 2.

The internal timer 415 is called every two milliseconds. The main purpose of this routine is to increment the software timers. However, a more complex function that it performs is that of the sanity timer.

There are only two statements in the entire code that can clear the hardware sanity timer. One is in the initialization routine 311 (FIG. 13), and the other is in this interval timer 415. Therefore, after initialization, if processor 210 is restarting the sanity timer, one can assume that the interrupt routines are operating properly. Processor 210 is answering the interrupt and correctly identifying the timer flag. As a double lock, the timer routine also increments a variable called {sanity_cntr}. The job of the task master 312 (FIG. 3) is to reset the counter after every successful loop. If the counter overflows, then the timer routine assumes that the main program, task master 313, is hopelessly hung up and goes into a tight loop. Processor 210 waits in this state until an external sanity timer expires producing a hardware reset. It is this double lock that assures that all parts of the software remain sane.

CONCLUSION

The foregoing detailed description explains one embodiment of our invention and those skilled in the art will be able to construct other embodiments using the concepts taught herein all without departing from the spirit and scope of our invention.

While two information fields have been shown together with a single bit signaling field more information fields can be utilized to provide different mixes of voice and/or data. Also it should be understood that the number of bits per channel is variable as is the form and substance of the various control messages on the signaling channel.

What is claimed is:

1. A telephone station having at least two communication modules, said telephone station comprising means for simultaneously exchanging information over at least two time separated information channels of a communication line, means for directing data in one of said information channels to one of said communication modules and for directing data in another one of said information channels to another one of said communication modules, and means for exchanging signaling information over said communication line in a signaling channel that is time separated from said information channels, said signaling information being accumulated over a plurality of time frames and being directed to either one of said communication modules.

2. The invention set forth in claim 1 wherein said means for directing is responsive to the time relationship of said information on said line.

3. The invention set forth in claim 2 further comprising means for accumulating data from a number of periodic frames of said signaling channel, said accumulated data being distributed in accordance with address information received over said signaling channel.

4. The invention set forth in claim 1 wherein one of said communication modules is adapted for communication with an auxiliary module, said one of said communication modules including means for redistributing at least a portion of said data distributed thereto from said signaling channel to said auxiliary module in accordance with a subaddress contained within said signaling channel distributed data.

5. A digital telephone station adapted for connection to a main processor via a single communication line over which at least two time separated multi-bit information channels are established and a single one bit signaling channel is established for communicating signaling messages to said digital telephone station, said digital telephone station comprising means for receiving information from said information channels and for separating said information into separate information streams, each stream associated with one of said information channels depending upon the channel in which said information is received, means for directing a first said information stream to a first communication module of said digital telephone station, means for directing a second said information stream to a second module of said digital telephone station, means for receiving data from said one bit signaling channel and for accumulating said data over a successive number of frames, and means for distributing said accumulated data over a signaling bus to either said first or to said second communication module.

6. The invention set forth in claim 5 wherein said accumulated data contains address information and wherein said distributing means includes means for directing said accumulated data over said signaling bus in accordance with said address information.

7. The invention set forth in claim 5 further comprising means for further distributing said accumulated data from either of said first or second modules to a third module.

8. The invention set forth in claim 7 wherein said accumulated data contains address information and wherein said further distributing means includes means for directing said accumulated data to said third module in accordance with said address information.

9. A communication system having a main processor and a plurality of telephone stations each said telephone station connectable to said main processor via a single communication line over which multiple time separated multi-bit information channels are established and a separate signaling channel is established for communicating signaling messages to said telephone station, said telephone station comprising means for receiving information from said information channels and for separating said information into separate information streams, each stream associated with one of said information channels, means for directing a first said information stream to a first communication module, means for directing a second said information stream to a second module, means for receiving data from said signaling channel and for accumulating said data over a number of frames, and means for distributing said accumulated data to said first and second module over a signaling bus common to said first and second modules.

10. The invention set forth in claim 9 wherein information is separated into said streams in accordance with the time relationship of said information on said line and wherein said accumulated signaling channel information is distributed in accordance with address information obtained within said accumulated information.

* * * * *